(12) United States Patent
Yao

(10) Patent No.: US 8,179,662 B2
(45) Date of Patent: May 15, 2012

(54) MONOLITHIC CERAMIC CAPACITOR

(75) Inventor: Takayuki Yao, Higashiomi (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 364 days.

(21) Appl. No.: 12/533,489

(22) Filed: Jul. 31, 2009

(65) Prior Publication Data
US 2010/0033895 A1 Feb. 11, 2010

(30) Foreign Application Priority Data
Aug. 6, 2008 (JP) .................. 2008-202564

(51) Int. Cl.
*H01G 4/06* (2006.01)

(52) U.S. Cl. ............. 361/321.4; 361/312.2; 361/306.1; 361/306.3; 361/311; 361/313

(58) Field of Classification Search .......... 361/321.4, 361/321.1, 321.2, 309, 311–313, 303–305, 361/306.1, 306.3
See application file for complete search history.

(56) References Cited

U.S. PATENT DOCUMENTS

| | | | |
|---|---|---|---|
| 6,144,546 A * | 11/2000 | Mizushima et al. | 361/303 |
| 6,522,521 B2 * | 2/2003 | Mizuno et al. | 361/321.4 |
| 6,853,536 B2 * | 2/2005 | Nakamura et al. | 361/321.4 |
| 7,751,764 B2 * | 7/2010 | Iinuma | 399/303 |
| 7,911,764 B2 * | 3/2011 | Sasabayashi et al. | 361/321.4 |

FOREIGN PATENT DOCUMENTS

| | | |
|---|---|---|
| CN | 1790568 A | 6/2006 |
| JP | 08-124785 A | 5/1996 |
| JP | 2002-020167 A | 1/2002 |
| JP | 2002-270455 A | 9/2002 |
| JP | 2002-294290 A | 10/2002 |
| JP | 2002-305124 A | 10/2002 |
| JP | 2006-287045 A | 10/2006 |
| JP | 2007-197233 A | 8/2007 |

* cited by examiner

*Primary Examiner* — Nguyen T Ha
(74) *Attorney, Agent, or Firm* — Dickstein Shapiro LLP

(57) ABSTRACT

A monolithic ceramic capacitor includes dielectric ceramic layers having a thickness of less than 1 μm. When this thickness is t and the crystal grains of a dielectric ceramic of the layers have a mean diameter of r, a mean number N of grain boundaries satisfies $0<N\leq2$ where $N=t/r-1$. The dielectric ceramic contains, as a main component, a perovskite type compound $ABO_3$ (where A is Ba or Ba and at least one of Ca and Sr, B is Ti or Ti and at least one of Zr and Hf), and further contains Mn and V as auxiliary components. On the basis of 100 molar parts of the main component, the content of Mn is 0.05 to 0.75 molar parts, the content of V is 0.05 to 0.75 molar parts, and the total content of Mn and V is 0.10 to 0.80 molar parts.

10 Claims, 1 Drawing Sheet

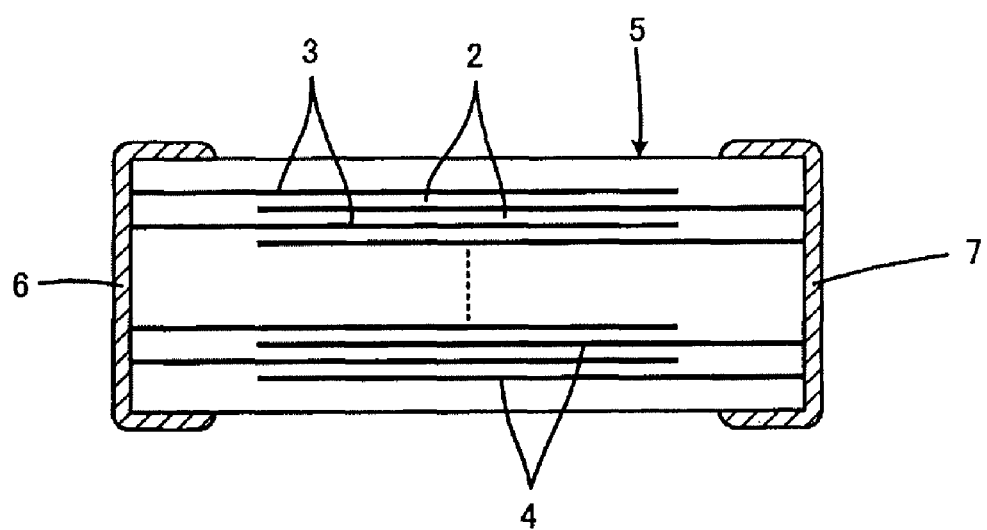

MONOLITHIC CERAMIC CAPACITOR

BACKGROUND OF THE INVENTION

1. Field of the Invention

The present invention relates to a monolithic ceramic capacitor, in particular, to an improvement for providing a monolithic ceramic capacitor including thinner dielectric ceramic layers.

2. Description of the Related Art

There is a demand for monolithic ceramic capacitors having a reduced size. The size of the monolithic ceramic capacitor can be effectively reduced by reducing the thickness of dielectric ceramic layers to provide a larger capacitance. When the thickness of dielectric ceramic layers is reduced, care must be taken such that a dielectric ceramic constituting the dielectric ceramic layers provides a sufficiently high reliability, in particular, in terms of its insulation property and life characteristics.

A dielectric ceramic suitable for reducing the thickness of dielectric ceramic layers is disclosed in, for example, Japanese Unexamined Patent Application Publication No. 2002-20167 (Patent Document 1). Patent Document 1 discloses a dielectric ceramic that is a sinter containing mole % of oxides of Ba and Ti in terms of $BaTiO_3$, 0.25 to mole % of oxides of Re (Re is one or more elements selected from Sm, Eu, Gd, Tb, Dy, Ho, Er, Tm, Yb, and Y) in terms of $Re_2O_3$, 0.2 to 1.5 mole % of oxides of Mg in terms of MgO, and 0.03 to 0.6 moles of oxides of one or more elements selected from Mn, V, and Cr in terms of $Mn_2O_3$, $V_2O_5$, and $Cr_2O_3$, respectively; and having a Ba/Ti ratio of 0.970 to 1.030.

In this composition, the presence of the element of Mn, V, or Cr enhances the insulation property of the dielectric ceramic and imparts a good life characteristic to the dielectric ceramic.

The demand for monolithic ceramic capacitors having a reduced size is becoming more stringent and there has been a demand for reduction in the thickness of dielectric ceramic layers to less than 1 µm. As the thickness of dielectric ceramic layers is reduced, an electric field applied to the dielectric ceramic layers increases. For this reason, a dielectric ceramic constituting dielectric ceramic layers needs a better insulation property and a better life characteristic to meet the above demand. However, the dielectric ceramic having a composition according to Patent Document 1 above mainly has a problem regarding the insulation property of the grain boundaries and does not have a sufficiently good life characteristic.

SUMMARY OF THE INVENTION

Accordingly, it is an object of the present invention to provide a monolithic ceramic capacitor in which the above-described problem is addressed.

Preferred embodiments of the present invention are directed to a monolithic ceramic capacitor including a capacitor body including a stack of a plurality of dielectric ceramic layers composed of a dielectric ceramic containing crystal grains and crystal grain boundaries, and a plurality of inner electrodes formed along interfaces between the dielectric ceramic layers; and a plurality of outer electrodes formed at different locations on outer surfaces of the capacitor body and electrically connected to the inner electrodes. To solve the above-described technical problem, a monolithic ceramic capacitor having such a configuration according to preferred embodiments of the present invention includes the following features.

The first feature is that, when the dielectric ceramic layers sandwiched between the inner electrodes adjacent to each other in the stacking direction of the stack have a thickness of t, and the crystal grains of the dielectric ceramic have a mean diameter of r, the thickness t is less than 1 µm and a mean number N of the grain boundaries satisfies $0 < N \leq 2$ where $N = t/r - 1$ where t and r are in the same units. The second feature is that, the dielectric ceramic contains, as a main component, a perovskite type compound represented by $ABO_3$ where A is Ba or Ba and at least one of Ca and Sr, and B is Ti or Ti and at least one of Zr and Hf; and the dielectric ceramic further contains Mn and V as auxiliary components where, on the basis of 100 molar parts of the main component, the content of Mn is 0.05 molar parts or more and 0.75 molar parts or less, the content of V is 0.05 molar parts or more and 0.75 molar parts or less, and the total content of Mn and V is 0.10 molar parts or more and 0.80 molar parts or less.

Preferably, the dielectric ceramic contains a $(Ba_{1-x}Ca_x)TiO_3$-based perovskite-type compound ($0 \leq x \leq 0.1$) as the main component and further contains, as auxiliary components, on the basis of 100 molar parts of the main component, 0.1 to 5.0 molar parts of a rare-earth element R (R is at least one element selected from La, Ce, Pr, Nd, Sm, Eu, Gd, Tb, Dy, Ho, Er, Tm, Yb, Lu, and Y), 0.1 to 2.0 molar parts of Mg, and 0.5 to 2.0 molar parts of Si.

Mn and V contained as auxiliary components in a dielectric ceramic constituting dielectric ceramic layers mainly have an advantageous effect of enhancing the insulation property of grain boundaries and enhancing the life characteristic of a dielectric ceramic. The effect of enhancing the insulation property of grain boundaries is provided with certainty when, on the basis of 100 molar parts of the main component, the content of Mn is 0.05 molar parts or more, the content of V is 0.05 molar parts or more, and the total content of Mn and V is 0.10 molar parts or more.

When the mean number N of grain boundaries is made to satisfy $0 < N \leq 2$, the volume ratio of grain boundaries to dielectric ceramic layers is decreased. As a result, Mn and V described above tend to diffuse uniformly over the grain boundaries. For this reason, large amounts of Mn and V are no longer required for enhancing the insulation property of the grain boundaries. When, on the basis of 100 molar parts of the main component, the content of Mn is more than 0.75 molar parts, the content of V is more than 0.75 molar parts, or the total content of Mn and V is more than 0.80 molar parts, segregation tends to occur and the life characteristic of the dielectric ceramic is adversely affected.

In summary, according to preferred embodiments of the present invention, the volume ratio of grain boundaries to dielectric ceramic layers is decreased while the contents of Mn and V are controlled to appropriate amounts at which segregation does not occur. As a result, even when dielectric ceramic layers have an ultra-small thickness of less than 1 µm, an excellent life characteristic can be imparted.

When such a dielectric ceramic according to preferred embodiments of the present invention contains a $(Ba_{1-x}Ca_x)TiO_3$-based perovskite-type compound as a main component and further contains, as auxiliary components, on the basis of 100 molar parts of the main component, 0.1 to 5.0 molar parts of the rare-earth element R, 0.1 to 2.0 molar parts of Mg, and 0.5 to 2.0 molar parts of Si, a life characteristic required under more stringent conditions can also be imparted.

Other features, elements, characteristics and advantages of the present invention will become more apparent from the following detailed description of preferred embodiments of the present invention with reference to the attached drawing.

BRIEF DESCRIPTION OF THE DRAWING

FIG. 1 shows a schematic section view of a monolithic ceramic capacitor 1 according to an embodiment of the present invention.

DESCRIPTION OF THE PREFERRED EMBODIMENTS

FIG. 1 shows a section view of a monolithic ceramic capacitor 1 including a dielectric ceramic according to an embodiment of the present invention.

The monolithic ceramic capacitor 1 includes a capacitor body 5 that is constituted by a stack of a plurality of dielectric ceramic layers 2 and a plurality of first inner electrodes 3 and a plurality of second inner electrodes 4 that are formed along interfaces between the dielectric ceramic layers 2. The dielectric ceramic layers 2 are composed of a dielectric ceramic containing crystal grains and crystal grain boundaries. The inner electrodes 3 and 4 are mainly composed of, for example, Ni.

A first outer electrode 6 and a second outer electrode 7 are respectively formed at different locations on outer surfaces of the capacitor body 5. The outer electrodes 6 and 7 are mainly composed of, for example, Cu. In the monolithic ceramic capacitor 1 shown in FIG. 1, the first outer electrode 6 and the second outer electrode 7 are respectively formed on opposite end surfaces of the capacitor body 5. The first inner electrodes 3 are electrically connected to the first outer electrode 6. The second inner electrodes 4 are electrically connected to the second outer electrode 7. The first inner electrodes 3 and the second inner electrodes 4 are arranged alternately in a direction in which the dielectric ceramic layers 2 are stacked.

When the monolithic ceramic capacitor 1 includes the dielectric ceramic layers 2 sandwiched between the first inner electrodes 3 and the second inner electrodes 4 adjacent to each other, the dielectric ceramic layers 2 having a thickness of t, and the crystal grains of a dielectric ceramic constituting the dielectric ceramic layers 2 have a mean diameter of r, the thickness t is less than 1 μm and a mean number N of grain boundaries satisfies 0<N≦2 where N=t/r−1 where t and r are in the same units.

The dielectric ceramic constituting the dielectric ceramic layers 2 contains, as a main component, a perovskite type compound represented by $ABO_3$ where A is Ba or Ba and at least one of Ca and Sr; B is Ti or Ti and at least one of Zr and Hf. The dielectric ceramic further contains Mn and V as auxiliary components. On the basis of 100 molar parts of the main component, the content of Mn is 0.05 molar parts or more and 0.75 molar parts or less, the content of V is 0.05 molar parts or more and 0.75 molar parts or less, and the total content of Mn and V is 0.10 molar parts or more and 0.80 molar parts or less.

Mn and V, which are contained in the dielectric ceramic as auxiliary components, are elements mainly having an effect of enhancing the insulation property of grain boundaries and enhancing the life characteristic of the dielectric ceramic. When the mean number N of grain boundaries is made to satisfy 0<N≦2, the volume ratio of the grain boundaries to the dielectric ceramic layers is decreased. As a result, Mn and V described above tend to diffuse uniformly over the grain boundaries. For this reason, large amounts of Mn and V are no longer required for enhancing the insulation property of the grain boundaries.

When, on the basis of 100 molar parts of the main component, the content of Mn is more than 0.75 molar parts, the content of V is more than 0.75 molar parts, or the total content of Mn and V is more than 0.80 molar parts, segregation tends to occur, which adversely affects the life characteristic of the dielectric ceramic. On the basis of 100 molar parts of the main component, the lower limit of the content of Mn is made 0.05 molar parts, the lower limit of the content of V is made 0.05 molar parts, and the lower limit of the total content of Mn and V is made 0.10 molar parts. This is because, when any one of these lower limits is not satisfied, the presence of Mn and V does not sufficiently enhance the insulation property of grain boundaries.

In summary, according to an embodiment of the present invention, the volume ratio of grain boundaries to dielectric ceramic layers is decreased while the contents of Mn and V are controlled to appropriate amounts with which segregation does not occur. As a result, even when the dielectric ceramic layers 2 have an ultra-small thickness of less than 1 μm, an excellent life characteristic can be imparted.

When such a dielectric ceramic contains a $(Ba_{1-x}Ca_x)TiO_3$-based perovskite-type compound as the main component and further contains, as auxiliary components, on the basis of 100 molar parts of the main component, 0.1 to 5.0 molar parts of a rare-earth element R, 0.1 to 2.0 molar parts of Mg, and 0.5 to 2.0 molar parts of Si, a life characteristic required under more stringent conditions can be imparted.

A monolithic ceramic capacitor according to the present invention is not restricted to a capacitor having the configuration shown in FIG. 1. For example, a monolithic ceramic capacitor according to the present invention may have a configuration where a plurality of inner electrodes provide a series capacitance in a capacitor body. Alternatively, a monolithic ceramic capacitor according to the present invention may have a multi-terminal configuration, for example, an array-type monolithic ceramic capacitor or a monolithic ceramic capacitor in which ESL is reduced.

Hereinafter, experimental examples performed in accordance with embodiments of the present invention are described.

Experimental Example 1

Monolithic ceramic capacitors were produced in a standard manner to include dielectric ceramics having different contents of (Mn+V) and different N values, and the influence of the content of (Mn+V) and the N value on the life characteristic of the capacitors was studied. Other than the contents of Mn and V, the dielectric ceramics had the same composition.

(A) Preparation of Dielectric Material Mixtures

Powders of $BaCO_3$ and $TiO_2$ were prepared as starting materials for the main component of the dielectric ceramics. These powders were weighed to correspond to the composition of $Ba_{1.008}TiO_3$. The resultant powders were heat-treated to provide a $Ba_{1.008}TiO_3$ powder having a mean particle diameter of 0.3 μm.

Powders of $Dy_2O_3$, $MgCO_3$, $MnCO_3$, $SiO_2$, and $V_2O_5$ were prepared as materials for auxiliary components of the dielectric ceramics. These powders were mixed with the $Ba_{1.008}TiO_3$ powder and water serving as a medium in a ball mill such that the compositions of the resultant mixtures were represented by the following formula and coefficients c and d in this formula satisfied values shown in Table 1 below.

$$100Ba_{1.008}TiO_3 + 0.7DyO_{3/2} + 1.4MgO + cMnO + dVO_{5/2} + SiO_2 \text{(coefficients in molar parts)} \quad \text{Composition formula}$$

The resultant mixtures were dried by vaporization to provide dielectric material mixtures.

(B) Production of Monolithic Ceramic Capacitors

A polyvinyl butyral-based binder and ethanol were added to each dielectric material mixture prepared above and the resultant mixture was wet blended with a ball mill to provide a ceramic slurry. This ceramic slurry was formed into sheets with a dip coater. Thus, ceramic green sheets were produced.

A conductive paste mainly composed of Ni was screen printed onto the resultant ceramic green sheets to form conductive paste films for constituting inner electrodes.

The resultant green sheets were then stacked such that alternate ones of the conductive paste films were exposed on opposite end surfaces of the stack. The resultant green stack was heated to 300° C. in a $N_2$ atmosphere to remove the binder. After that, the resultant stack was fired at 1150° C. for 2 hours in a reducing atmosphere composed of $H_2$—$N_2$—$H_2O$ gas and having a partial pressure of oxygen of $10^{-10}$ MPa. Thus, a sintered ceramic stack was obtained.

The end surfaces of the resultant ceramic stack were coated with a Cu paste containing $B_2O_3$—$Li_2O$—$SiO_2$—$BaO$ glass frit. The coated paste was baked in a $N_2$ atmosphere at 800° C. to form outer electrodes electrically connected to the inner electrodes. Thus, monolithic ceramic capacitors corresponding to Samples 101 to 120 were obtained.

Each monolithic ceramic capacitor had a length of 2.0 mm, a width of 1.2 mm, and a thickness of 1.0 mm. The thicknesses t of dielectric ceramic layers sandwiched between inner electrodes were less than 1000 nm in all the samples and are shown in Table 1 below. The number of effective dielectric ceramic layers was 100. The overlapping area of the electrodes per dielectric ceramic layer was 1.4 $mm^2$.

(C) Characteristic Evaluation and Observation of Ceramic Microstructure

To evaluate a characteristic of the capacitors, the capacitors were subjected to a high temperature loading life test. Specifically, a direct voltage of 6.3 V was applied to the capacitors at 85° C. and 125° C. and the capacitors were measured in terms of variation in insulation resistance over time. This high temperature loading life test was performed for 100 samples for each sample number. Samples having a reduced insulation resistance of 100 kΩ or less by the lapsed time of 1000 hours or 2000 hours in the test were evaluated as defectives. The numbers of such defectives are shown in Table 2 below.

The ceramic microstructures of the capacitors were observed. Specifically, each monolithic ceramic capacitor was cut to provide a section serving as a sample. The resultant section was etched such that grain boundaries were clearly observed. A secondary electron image of the resultant section was observed with a FE-SEM. In this observation, the mean diameter (mean diameter of equivalent circles) of crystal grains was calculated in a field of view including about 50 crystal grains. This calculation process was performed for five fields of view and the resultant mean diameters were averaged to provide a mean grain diameter r. A mean number N of grain boundaries was then calculated on the basis of $N=t/r-1$. The resultant mean grain diameters r and the resultant mean numbers N of grain boundaries are shown in Table 1 below.

(D) Results

TABLE 1

| Sample No. | t (nm) | r (nm) | N | c | d | c + d |
|---|---|---|---|---|---|---|
| 101 | 900 | 300 | 2.00 | 0.05 | 0 | 0.05 |
| 102 | 950 | 750 | 0.27 | 0.30 | 0 | 0.30 |

TABLE 1-continued

| Sample No. | t (nm) | r (nm) | N | c | d | c + d |
|---|---|---|---|---|---|---|
| 103 | 850 | 320 | 1.66 | 0 | 0.30 | 0.30 |
| 104 | 950 | 350 | 1.71 | 0.15 | 0.05 | 0.20 |
| 105 | 750 | 290 | 1.59 | 0.40 | 0.40 | 0.80 |
| 106 | 980 | 420 | 1.33 | 0.25 | 0.10 | 0.35 |
| 107 | 750 | 290 | 1.59 | 0.05 | 0.90 | 0.95 |
| 108 | 700 | 320 | 1.19 | 0.05 | 0 | 0.05 |
| 109 | 850 | 220 | 2.86 | 0.20 | 0.20 | 0.40 |
| 110 | 720 | 240 | 2.00 | 0.10 | 0.25 | 0.35 |
| 111 | 950 | 350 | 1.71 | 0.30 | 0.50 | 0.80 |
| 112 | 950 | 240 | 2.96 | 0.50 | 0.50 | 1.00 |
| 113 | 950 | 180 | 4.28 | 0.10 | 0.10 | 0.20 |
| 114 | 950 | 340 | 1.79 | 0.05 | 0.75 | 0.80 |
| 115 | 900 | 170 | 4.29 | 0.05 | 0.35 | 0.40 |
| 116 | 990 | 210 | 3.71 | 0.20 | 0.20 | 0.40 |
| 117 | 850 | 300 | 1.83 | 0.05 | 0.05 | 0.10 |
| 118 | 890 | 120 | 6.42 | 0.25 | 0.65 | 0.90 |
| 119 | 950 | 110 | 7.64 | 0.20 | 0.20 | 0.40 |
| 120 | 870 | 100 | 7.70 | 0.10 | 0.10 | 0.20 |

TABLE 2

| Sample No. | Number of defectives (85° C./6.3 V) | | Number of detectives (125° C./6.3 V) | |
|---|---|---|---|---|
| | 1000 hours | 2000 hours | 1000 hours | 2000 hours |
| 101 | 3/100 | 7/100 | 9/100 | 15/100 |
| 102 | 2/100 | 5/100 | 7/100 | 10/100 |
| 103 | 1/100 | 4/100 | 0/100 | 0/100 |
| 104 | 0/100 | 0/100 | 0/100 | 0/100 |
| 105 | 0/100 | 0/100 | 0/100 | 0/100 |
| 106 | 0/100 | 0/100 | 0/100 | 0/100 |
| 107 | 0/100 | 3/100 | 0/100 | 5/100 |
| 108 | 1/100 | 3/100 | 2/100 | 6/100 |
| 109 | 0/100 | 1/100 | 0/100 | 2/100 |
| 110 | 0/100 | 0/100 | 0/100 | 0/100 |
| 111 | 0/100 | 0/100 | 0/100 | 0/100 |
| 112 | 0/100 | 2/100 | 3/100 | 5/100 |
| 113 | 1/100 | 3/100 | 3/100 | 5/100 |
| 114 | 0/100 | 0/100 | 0/100 | 0/100 |
| 115 | 0/100 | 1/100 | 1/100 | 3/100 |
| 116 | 0/100 | 1/100 | 2/100 | 4/100 |
| 117 | 0/100 | 0/100 | 0/100 | 0/100 |
| 118 | 1/100 | 2/100 | 5/100 | 6/100 |
| 119 | 1/100 | 3/100 | 5/100 | 8/100 |
| 120 | 2/100 | 3/100 | 4/100 | 8/100 |

Table 2 shows that Sample Nos. 104, 105, 106, 110, 111, 114, and 117 did not have defectives in the high temperature loading test at the higher loading level as well as in the high temperature loading test at the lower loading level. Thus, these Samples exhibited excellent reliability. Referring to Table 1, these Sample Nos. 104, 105, 106, 110, 111, 114, and 117 satisfied the following conditions: $0 \leq N \leq 2$, $0.05 \leq c \leq 0.75$, $0.05 \leq d \leq 0.75$, and $0.10 \leq c+d \leq 0.80$.

In contrast, Sample Nos. 101 to 103, 107 to 109, 112, 113, 115, 116, and 118 to 120, which did not satisfy at least one of the following conditions: $0 < N \leq 2$, $0.05 \leq c \leq 0.75$, $0.05 \leq d \leq 0.75$, and $0.10 \leq c+d \leq 0.80$, had one or more defectives under at least one of the test conditions in the high temperature loading tests.

Experimental Example 2

Monolithic ceramic capacitors were produced such that the compositions of dielectric ceramics were variously changed while the thickness t of dielectric ceramic layers and the mean number N of grain boundaries of the dielectric ceramic layers were made almost the same over the capacitors, and these capacitors were evaluated. Experimental example 2 was intended to determine a more preferred composition range for enhancing the reliability of a monolithic ceramic capacitor.

(A) Preparation of Dielectric Material Mixtures

Powders of $BaCO_3$, $CaCO_3$, and $TiO_2$ were prepared as starting materials for the main component of the dielectric ceramics. These powders were weighed to correspond to the compositions of $(Ba_{1-x}Ca_x)_mTiO_3$ where x and m are shown in Table 3 below. The resultant powders were heat-treated to provide $(Ba_{1-x}Ca_x)_mTiO_3$ powders having a mean particle diameter of 0.3 μm.

Powders of $MgCO_3$, $MnCO_3$, $SiO_2$, and $V_2O_5$ and oxides of Rs (R is at least one element selected from La, Ce, Pr, Nd, Sm, Eu, Gd, Tb, Dy, Ho, Er, Tm, Yb, Lu, and Y) were prepared as materials for auxiliary components of the dielectric ceramics. These oxides were mixed with the $(Ba_{1-x}Ca_x)_mTiO_3$ powders and water serving as a medium with a ball mill such that the compositions of the resultant mixtures were represented by the following formula R in this formula corresponded to R components shown in Table 3, and coefficients a, b, c, and d in the formula satisfied values shown in Table 3.

$100(Ba_{1-x}Ca_x)_mTiO_3 + aRO_{3/2} + bMgO + cMnO + dVO_{5/2} + eSiO_2$ (coefficients in molar parts) Composition formula The resultant mixtures were dried by vaporization to provide dielectric material mixtures.

(B) Production of Monolithic Ceramic Capacitors

Monolithic ceramic capacitors corresponding to Sample Nos. 201 to 224 were obtained in the same manner as in Experimental example 1. The thickness t of dielectric ceramic layers of each capacitor was made to be 0.8 μm.

(C) Characteristic Evaluation and Observation of Ceramic Microstructure

Characteristics of the capacitors were evaluated and the ceramic microstructures of the capacitors were observed in the same manner as in Experimental example 1. The results of the characteristic evaluation are shown in Table below. Sample Nos. 201 to 224 had a mean number N of grain boundaries of about 1.5.

(D) Results

TABLE 3

| Sample No. | x | m | Details of R component | a | b | c | d | e |
|---|---|---|---|---|---|---|---|---|
| 201 | 0 | 1.014 | 1.0Gd, 0.5Dy | 1.5 | 0.8 | 0.30 | 0.30 | 0.7 |
| 202 | 0.1 | 1.018 | 1.3Dy, 0.7Y | 2.0 | 1.3 | 0.25 | 0.30 | 0.9 |
| 203 | 0.3 | 1.020 | 0.6Ho, 0.7Y | 1.3 | 1.6 | 0.30 | 0.15 | 1.1 |
| 204 | 0.05 | 0.960 | 0.2Dy, 0.8Y | 1.0 | 1.2 | 0.20 | 0.15 | 0.8 |
| 205 | 0.03 | 0.900 | 0.5Sm, 0.2Y | 0.7 | 0.8 | 0.25 | 0.20 | 1.3 |
| 206 | 0 | 1.045 | 0.8Tb, 0.3Yb | 1.1 | 1.5 | 0.15 | 0.10 | 1.6 |
| 207 | 0.04 | 1.030 | 0.5Sm, 0.3Dy | 0.8 | 0.9 | 0.20 | 0.30 | 1.5 |
| 208 | 0 | 1.015 | 0.1Gd | 0.1 | 1.1 | 0.15 | 0.15 | 1.0 |
| 209 | 0.08 | 1.012 | 1.1Gd, 3.9Y | 5.0 | 1.0 | 0.30 | 0.35 | 1.2 |
| 210 | 0.01 | 1.020 | 0.05Eu | 0.05 | 0.5 | 0.15 | 0.20 | 0.6 |
| 211 | 0.03 | 1.018 | 1.3Ho, 4.0Yb | 5.3 | 0.7 | 0.10 | 0.10 | 0.4 |
| 212 | 0 | 1.023 | 2.0Er, 5.2Y | 7.2 | 1.3 | 0.40 | 0.40 | 1.1 |
| 213 | 0 | 1.018 | 0.3Dy | 0.3 | 0.1 | 0.10 | 0.05 | 1.3 |
| 214 | 0.08 | 1.020 | 0.2Er, 0.3Lu | 0.5 | 2.0 | 0.10 | 0.10 | 1.5 |
| 215 | 0.06 | 0.990 | 1.1Tm, 0.3Yb | 1.4 | 0.05 | 0.15 | 0.20 | 0.9 |
| 216 | 0 | 1.029 | 0.4Gd, 4.0Eu | 4.4 | 2.1 | 0.10 | 0.10 | 0.7 |
| 217 | 0.04 | 1.025 | 0.6Ce, 0.3Dy | 0.9 | 1.1 | 0.15 | 0.20 | 0.5 |
| 218 | 0.07 | 0.980 | 1.0Dy | 1.0 | 1.2 | 0.40 | 0.30 | 2.0 |
| 219 | 0.01 | 1.008 | 0.7Nd, 0.1Ho | 0.8 | 0.4 | 0.15 | 0.15 | 0.3 |
| 220 | 0.1 | 1.010 | 3.0Eu, 0.3Yb | 3.3 | 1.4 | 0.13 | 0.12 | 2.4 |
| 221 | 0.07 | 1.020 | 0.4Y | 0.4 | 0.8 | 0.17 | 0.13 | 1.8 |
| 222 | 0 | 1.019 | 1.0Gd, 0.2Pr | 1.2 | 1.8 | 0.41 | 0.34 | 2.2 |
| 223 | 0.03 | 1.025 | 1.5Dy, 1.3Ho | 2.8 | 0.7 | 0.13 | 0.12 | 0.7 |
| 224 | 0.03 | 1.000 | 0.9Gd, 0.1La | 1.0 | 1.2 | 0.25 | 0.5 | 0.9 |

TABLE 4

| Sample No. | Number of defectives (85° C./6.3 V) | | Number of defectives (125° C./6.3 V) | |
|---|---|---|---|---|
| | 1000 hours | 2000 hours | 1000 hours | 2000 hours |
| 201 | 0/100 | 0/100 | 0/100 | 0/100 |
| 202 | 0/100 | 0/100 | 0/100 | 0/100 |
| 203 | 0/100 | 0/100 | 0/100 | 1/100 |
| 204 | 0/100 | 0/100 | 0/100 | 0/100 |
| 205 | 0/100 | 0/100 | 0/100 | 1/100 |
| 206 | 0/100 | 0/100 | 0/100 | 2/100 |
| 207 | 0/100 | 0/100 | 0/100 | 0/100 |
| 208 | 0/100 | 0/100 | 0/100 | 0/100 |
| 209 | 0/100 | 0/100 | 0/100 | 0/100 |
| 210 | 0/100 | 0/100 | 0/100 | 2/100 |
| 211 | 0/100 | 0/100 | 0/100 | 1/100 |
| 212 | 0/100 | 0/100 | 0/100 | 1/100 |
| 213 | 0/100 | 0/100 | 0/100 | 0/100 |
| 214 | 0/100 | 0/100 | 0/100 | 0/100 |
| 215 | 0/100 | 0/100 | 0/100 | 1/100 |
| 216 | 0/100 | 0/100 | 0/100 | 1/100 |
| 217 | 0/100 | 0/100 | 0/100 | 0/100 |
| 218 | 0/100 | 0/100 | 0/100 | 0/100 |
| 219 | 0/100 | 0/100 | 0/100 | 1/100 |
| 220 | 0/100 | 0/100 | 0/100 | 1/100 |
| 221 | 0/100 | 0/100 | 0/100 | 0/100 |
| 222 | 0/100 | 0/100 | 0/100 | 0/100 |
| 223 | 0/100 | 0/100 | 0/100 | 0/100 |
| 224 | 0/100 | 0/100 | 0/100 | 0/100 |

Sample Nos. 201 to 224 produced in Experimental example 2 are all within the scope of the present invention. Table 4 shows that Sample Nos. 201 to 224 had few defectives in the high temperature loading tests and those defectives were provided only under the most severe test conditions.

Among Sample Nos. 201 to 224, Sample Nos. 201, 202, 204, 207 to 209, 213, 214, 217, 218, and 221 to 224 are in a preferred scope of the present invention. Specifically, these samples further satisfied that dielectric ceramics contained a $(Ba_{1-x}Ca_x)_mTiO_3$ as a main component and further contained, as auxiliary components, on the basis of 100 molar parts of the main component, 0.1 to 5.0 molar parts of a rare-earth element R (see "a" in Table 3), 0.1 to 2.0 molar parts of Mg (see "b" in Table 3), and 0.5 to 2.0 molar parts of Si (see "e" in Table 3). As a result, these Samples did not have any defectives even in the high temperature loading test at the most severe conditions and exhibited excellent reliability.

Experimental Example 3

The influence of impurities was evaluated in Experimental example 3. The presence of Mo, W, Cu, Sr, Zr, Hf, Zn, Na, Ag, Ni, or Pd as an impurity can occur in the production processes of monolithic ceramic capacitors, such as, in the preparation of materials, depending to the raw materials and conditions employed. As a result, these impurities can be present in crystal grains and crystal grain boundaries among crystal grains. There may also be cases where the components of inner electrodes diffuse into and remain in crystal grains and crystal grain boundaries among crystal grains, for example, in a firing process for producing monolithic ceramic capacitors.

(A) Preparation of Dielectric Material Mixtures

Dielectric material mixtures corresponding to Sample Nos. 301 to 307 were obtained by adding impurities shown in Table 5 below to dielectric material mixtures corresponding to Sample No. 201 prepared in Experimental example 2.

TABLE 5

| Sample No. | Impurity component Details | Content (Molar part) |
|---|---|---|
| 301 | 0.4Zr, 0.01Zn, 0.02Ag | 0.43 |
| 302 | 0.3Zr, 0.18Pd, 0.1Mo | 0.58 |
| 303 | 0.21Zr, 0.1Hf, 0.06Ag | 0.37 |
| 304 | 0.8Zr, 0.1Ag, 0.09Sr | 0.99 |
| 305 | 0.1Cu, 0.02Zn, 0.04W | 0.16 |
| 306 | 0.3Ni, 0.03Hf, 0.02Pd | 0.35 |
| 307 | 0.6Pd, 0.1Mo, 0.01Na | 0.71 |

(B) Production of Monolithic Ceramic Capacitors

Monolithic ceramic capacitors having the same specifications as in Experimental example 2 and corresponding to Sample Nos. 301 to 307 were obtained in the same manner as in Experimental example 2.

(C) Characteristic Evaluation and Observation of Ceramic Microstructure

The characteristics of the capacitors were evaluated and the ceramic microstructures of the capacitors were observed in the same manner as in Experimental example 1. The results of the characteristic evaluation are shown in Table 6 below. Sample Nos. 301 to 307 had a mean number N of grain boundaries of about 1.5.

(D) Results

TABLE 6

| | Number of defectives (85° C./6.3 V) | | Number of defectives (125° C./6.3 V) | |
|---|---|---|---|---|
| Sample No. | 1000 hours | 2000 hours | 1000 hours | 2000 hours |
| 301 | 0/100 | 0/100 | 0/100 | 0/100 |
| 302 | 0/100 | 0/100 | 0/100 | 0/100 |
| 303 | 0/100 | 0/100 | 0/100 | 0/100 |
| 304 | 0/100 | 0/100 | 0/100 | 0/100 |
| 305 | 0/100 | 0/100 | 0/100 | 0/100 |
| 306 | 0/100 | 0/100 | 0/100 | 0/100 |
| 307 | 0/100 | 0/100 | 0/100 | 0/100 |

Table 6 shows that Sample Nos. 301 to 307 exhibited the same excellent reliability as with Sample 201 produced in Experimental example 2.

Experimental Example 4

Various sintering aids were evaluated in Experimental example 4.

(A) Preparation of Dielectric Material Mixtures

Dielectric material mixtures corresponding to Sample Nos. 401 to 407 were obtained by adding the sintering aids shown in Table 7 below to dielectric material mixtures corresponding to Sample No. 201 prepared in Experimental example 2.

TABLE 7

| | Sintering aid component | |
|---|---|---|
| Sample No. | Details | Content (Molar part) |
| 401 | 0.8Si | 0.8 |
| 402 | 0.25Si, 0.65Ti | 0.9 |
| 403 | 1.2Si, 0.3Li | 1.5 |
| 404 | 2.1Si, 0.4Li, 0.3Na | 2.8 |
| 405 | 0.05Si, 0.25B | 0.3 |
| 406 | 1.5Si, 0.5B, 0.1K | 2.1 |
| 407 | 0.2Si, 0.1Mg | 0.3 |

(B) Production of Monolithic Ceramic Capacitors

Monolithic ceramic capacitors having the same specifications as in Experimental example 2 and corresponding to Sample Nos. 401 to 407 were obtained in the same manner as in Experimental example 2.

(C) Characteristic Evaluation and Observation of Ceramic Microstructure

The characteristics of the capacitors were evaluated and the ceramic microstructures of the capacitors were observed in the same manner as in Experimental example 1. The results of the characteristic evaluation are shown in Table 8 below. Sample Nos. 401 to 407 had a mean number N of grain boundaries of about 1.5.

(D) Results

TABLE 8

| | Number of defectives (85° C./6.3 V) | | Number of defectives (125° C./6.3 V) | |
|---|---|---|---|---|
| Sample No. | 1000 hours | 2000 hours | 1000 hours | 2000 hours |
| 401 | 0/100 | 0/100 | 0/100 | 0/100 |
| 402 | 0/100 | 0/100 | 0/100 | 0/100 |
| 403 | 0/100 | 0/100 | 0/100 | 0/100 |
| 404 | 0/100 | 0/100 | 0/100 | 0/100 |
| 405 | 0/100 | 0/100 | 0/100 | 0/100 |
| 406 | 0/100 | 0/100 | 0/100 | 0/100 |
| 407 | 0/100 | 0/100 | 0/100 | 0/100 |

Table 8 shows that Sample Nos. 401 to 407 all exhibited the same excellent reliability as with Sample 201 produced in Experimental example 2.

In Experimental examples 1 to 4 above, $(Ba_{1-x}Ca_x)_m TiO_3$ ($0 \leq x \leq 0.1$) was used as the main component of the dielectric ceramics. Alternatively, it has been confirmed that substantially the same results as in Experimental examples 1 to 4 are obtained when Sr is used instead of or in addition to Ca, or Ti is partially substituted with at least one of Zr and Hf.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A monolithic ceramic capacitor comprising:
   a capacitor body comprising
      a stack of a plurality of dielectric ceramic layers comprising a dielectric ceramic containing crystal grains and crystal grain boundaries, and
      a plurality of inner electrodes, each of which is disposed at a different interface between adjacent dielectric ceramic layers; and
   a plurality of outer electrodes disposed at different locations on outer surfaces of the capacitor body and electrically connected to the inner electrodes,
   wherein, when the dielectric ceramic layers sandwiched between the inner electrodes adjacent to each other in a stacking direction of the stack have a thickness of t µm, and the crystal grains of the dielectric ceramic have a mean diameter of r µm, the thickness t is less than 1 µm and a mean number N of the grain boundaries satisfies 0<N≦2 where N=t/r−1, and
   the dielectric ceramic contains, as a main component, a perovskite type compound represented by $ABO_3$ where A is Ba or Ba and at least one of Ca and Sr, and B is Ti or Ti and at least one of Zr and Hf; and the dielectric ceramic further contains Mn and V as auxiliary components where, on the basis of 100 molar parts of the main component, the content of Mn is 0.05 molar parts to 0.75 molar parts, the content of V is 0.05 molar parts to 0.75 molar parts, and the total content of Mn and V is 0.10 molar parts to 0.80 molar parts.

2. The monolithic ceramic capacitor according to claim 1, wherein the content of Mn is 0.1 to 0.4 molar parts, the content of V is 0.1 to 0.5 molar parts, and the total content of Mn and V is 0.2 to 0.8 molar parts.

3. The monolithic ceramic capacitor according to claim 1, wherein the $ABO_3$ perovskite is $(Ba_{1-x}Ca_x)TiO_3$ in which $0 \leq x \leq 0.1$, and the dielectric ceramic contains as auxiliary components, on the basis of 100 molar parts of the main component, 0.1 to 5.0 molar parts of a rare-earth element R in which R is at least one element selected from La, Ce, Pr, Nd, Sm, Eu, Gd, Tb, Dy, Ho, Er, Tm, Yb, Lu, and Y, 0.1 to 2.0 molar parts of Mg, and 0.5 to 2.0 molar parts of Si.

4. The monolithic ceramic capacitor according to claim 3, wherein the auxiliary components, on the basis of 100 molar parts of the main component, are 0.3 to 2.8 molar parts of a rare-earth element R, 0.7 to 1.8 molar parts of Mg, and 0.5 to 1.5 molar parts of Si.

5. The monolithic ceramic capacitor according to claim 4, wherein the content of Mn is 0.15 to 0.41 molar parts, and the content of V is 0.15 to 0.5 molar parts.

6. A dielectric ceramic containing, as a main component, a perovskite type compound represented by $ABO_3$ where A is Ba or Ba and at least one of Ca and Sr, and B is Ti or Ti and at least one of Zr and Hf; and the dielectric ceramic further contains Mn and V as auxiliary components where, on the basis of 100 molar parts of the main component, the content of Mn is 0.05 molar parts to 0.75 molar parts, the content of V is 0.05 molar parts to 0.75 molar parts, and the total content of Mn and V is 0.10 molar parts to 0.80 molar parts, and 0.1 to 5.0 molar parts of a rare-earth element R in which R is at least one element selected from La, Ce, Pr, Nd, Sm, Eu, Gd, Tb, Dy, Ho, Er, Tm, Yb, Lu, and Y.

7. The dielectric ceramic according to claim 6, wherein the content of Mn is 0.1 to 0.4 molar parts, the content of V is 0.1 to 0.5 molar parts, and the total content of Mn and V is 0.2 to 0.8 molar parts.

8. The dielectric ceramic according to claim 6, wherein the $ABO_3$ perovskite is $(Ba_{1-x}Ca_x)TiO_3$ in which $0 \leq x \leq 0.1$, and the dielectric ceramic contains as auxiliary components, on the basis of 100 molar parts of the main component 0.1 to 2.0 molar parts of Mg, and 0.5 to 2.0 molar parts of Si.

9. The monolithic ceramic capacitor according to claim 8, wherein the auxiliary components, on the basis of 100 molar parts of the main component, are 0.3 to 2.8 molar parts of a rare-earth element R, 0.7 to 1.8 molar parts of Mg, and 0.5 to 1.5 molar parts of Si.

10. The monolithic ceramic capacitor according to claim 9, wherein the content of Mn is 0.15 to 0.41 molar parts, and the content of V is 0.15 to 0.5 molar parts.

* * * * *